(12) United States Patent
Vogel et al.

(10) Patent No.: US 8,119,235 B1
(45) Date of Patent: *Feb. 21, 2012

(54) MULTILAYER, CO-EXTRUDED, IONOMERIC DECORATIVE SURFACING

(75) Inventors: Randall Allen Vogel, Wilmington, DE (US); I-Hwa Lee, Wilmington, DE (US); Sumita Sanjeevi Ranganathan, Midlothian, VA (US); Lori J. Pike, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/827,257

(22) Filed: Jul. 11, 2007

Related U.S. Application Data

(62) Division of application No. 09/833,452, filed on Apr. 12, 2001.

(60) Provisional application No. 60/197,275, filed on Apr. 14, 2000.

(51) Int. Cl.
*B32B 27/08* (2006.01)
*B32B 5/00* (2006.01)
*B32B 27/00* (2006.01)

(52) U.S. Cl. ............ 428/339; 428/332; 428/475.8; 428/476.3; 428/476.9; 428/483; 428/515; 428/520

(58) Field of Classification Search .............. None
See application file for complete search history.

(56) References Cited

U.S. PATENT DOCUMENTS

| | | |
|---|---|---|
| 1,155,558 A | 10/1915 | Folsom |
| 3,264,272 A | 8/1966 | Rees |
| 3,791,915 A | 2/1974 | Goehring et al. |
| 4,335,175 A | 6/1982 | Webb |
| 4,351,931 A | 9/1982 | Armitage |
| 4,810,540 A | 3/1989 | Ellison et al. |
| 4,844,955 A | 7/1989 | Graefe |
| 4,863,784 A | 9/1989 | Lustig |
| 4,931,324 A | 6/1990 | Ellison et al. |
| 4,943,680 A | 7/1990 | Ellison et al. |
| 4,999,227 A | 3/1991 | Vander Togt |
| 5,028,674 A | 7/1991 | Hatch et al. |
| 5,037,680 A | 8/1991 | Papendick et al. |
| 5,210,138 A | 5/1993 | Yamamoto |
| 5,342,666 A | 8/1994 | Ellison et al. |
| 5,468,532 A | 11/1995 | Ho et al. |
| 5,512,337 A | 4/1996 | Littmann et al. |
| 5,514,427 A | 5/1996 | Ellison et al. |
| 5,622,780 A | 4/1997 | Paleari |
| 5,643,999 A | 7/1997 | Lee et al. |
| 5,679,422 A | 10/1997 | Lind |
| 5,707,697 A | 1/1998 | Spain et al. |
| 5,712,044 A | 1/1998 | Fanselow |
| 5,725,712 A | 3/1998 | Spain et al. |
| 5,766,744 A | 6/1998 | Fanselow et al. ............. 428/213 |
| 5,789,048 A | 8/1998 | Flieger ...................... 428/36.92 |
| 5,846,620 A | 12/1998 | Compton |
| 5,858,404 A | 1/1999 | Dous et al. .................. 425/461 |
| 5,866,658 A | 2/1999 | Talkowski |
| 5,985,079 A | 11/1999 | Ellison |
| RE36,457 E | 12/1999 | Ellison et al. |
| 6,010,792 A | 1/2000 | Lind |
| 6,019,923 A | 2/2000 | Pelzer |
| 6,060,135 A | 5/2000 | Service |
| 6,319,438 B1 | 11/2001 | Smith et al. ..................... 264/75 |
| 6,770,360 B2 | 8/2004 | Mientus et al. ............... 428/354 |

FOREIGN PATENT DOCUMENTS

| | | |
|---|---|---|
| DE | 44 23 883 A1 | 1/1995 |
| EP | 0 342 244 A1 | 11/1989 |
| EP | 0 343 877 A2 | 11/1989 |
| EP | 0 266 109 B1 | 7/1993 |
| EP | 0 949 120 A1 | 10/1999 |
| EP | 1 041 110 A1 | 10/2000 |
| JP | 049 129776 | 12/1974 |
| JP | 56 146758 A | 11/1981 |
| JP | 58 155953 A | 9/1983 |
| JP | 01235635 A | 9/1989 |
| JP | 03 024954 | 2/1991 |
| JP | 04345628 A | 12/1992 |
| WO | WO 94/03337 A2 | 2/1994 |
| WO | WO 96/40480 A1 | 12/1996 |
| WO | WO 98/08901 A1 | 3/1998 |
| WO | WO 99/66002 A2 | 12/1999 |

OTHER PUBLICATIONS

PCT International Search Report dated Aug. 17, 2001, for International application No. PCT/US 01/11867.
"*Ullmann's Encyclopaedia of Industrial Chemistry*", vol. AII, p. 65-111, 5th Edition (1988) VCH.
"*Rompp Lexikon Chemie*", 10th Edition (1997), Georg Thieme Verlag.
"*Ullmann's Encyclopaedia of Industrial Chemistry*", vol. A24 p. 529-550, 5th Edition (1993), VCH.
"*Kunststoff-Lexikon*" (Plastics Lexicon), 9th Edition (1998), Hanser Verlag.
"*Plastics Films*". 2nd Edition (1983), The Plastics and Rubber Institute.
"The Plastics Chemistry, Physics, Technology Plastics Handbook 1", edited by Dr. Bodo Carlowitz (1990).
"*Kunststoff-Handbuch*" (Handbook of Polymers), 1st Edition (1990), Hanser Verlag, vol. 1: "Kunststoffe".
"Handbuch der Kunststoff-Extrusionstechnik", vol. II: "Extrusionsanlagen", Hanser Verlag (1986).
www.dupont.com(industrial-polymers/bexloy/H-73710-1.html (2006).

*Primary Examiner* — Monique Jackson
(74) *Attorney, Agent, or Firm* — Lucas K. Shay

(57) ABSTRACT

Decorative ionomeric surfaced film and sheet (e.g., multilayer co-extruded polymer) and articles made therefrom (e.g., automotive panels and parts) exhibiting good weatherability, mar resistance, and surface appearance of a high quality automotive finish (including color, haze, gloss, and DOI) and economical process for making (e.g., co-extrusion) and using (e.g., thermoforming and injection backfilling) the same.

10 Claims, No Drawings

MULTILAYER, CO-EXTRUDED, IONOMERIC DECORATIVE SURFACING

CROSS-REFERENCE TO RELATED APPLICATIONS

This application is a division of application Ser. No. 09/833,452, filed Apr. 12, 2001, which claims the benefit of priority to provisional application 60/197,275 filed Apr. 14, 2000, herein incorporated by reference.

BACKGROUND OF THE INVENTION

1. Field of the Invention

The present invention relates to multilayer, co-extruded, ionomeric thermoplastic sheet and film, articles manufactured with a decorative surface of such sheet and film, and processes for making shaped articles having a top surface of decorative ionomeric film.

2. Description of the Related Art

To describe the background of the present invention in this section and various components used in the invention, various patents are referenced. Each of these patents is incorporated herein by reference.

There is an increasing need, particularly in the automotive industry, for panels and parts made of polymer materials. Use of such polymer panels and parts provide numerous benefits. For example, weight of the finished assembly is reduced (important for automobiles), capital costs associated with plastic are lower than with metal, styling freedom is increased (important in automotive industry where there are more and more model demands), and manufacturing (plastic tooling) costs are lowered.

Use of such parts and panels, however, has been limited by various problems. Typically, polymer surfaced panels do not present a surface appearance comparable to a high quality automobile finish or do not provide a good bonding surface for the paints needed to achieve the high quality finish. Furthermore, high quality painting can be costly and present significant environmental, as well as safety and health problems, particularly those associated with volatile organic carriers used in paints. Other concerns with polymer parts include suitable properties and durability of those properties with extended outdoor exposure, including high gloss appearance, impact strength, high temperature properties (e.g. tensile strength and dimensional stability), low temperature properties, durability, scratch and mar resistance, and distortion of appearance at weld lines and with complex parts such as those made with deep draw. Attempts to solve these problems have met with mixed success.

Producing a surfacing film with paint like appearance has experienced limited success due to problems in processing films onto articles and unattractive economics for films in replacing paint. Fashioning a surfacing (skin) film system that can replace paint appearance is challenging since the film is required to meet many specifications including appearance that is similar to paint in both solid and metallic colors. In metallic paint application, a special effort must be made to control the size of the effect particles and the particles' orientation in painted surfaces in order to exhibit the desired metallic appearance. Flat or higher aspect ratio (length to thickness) effect particles in paint formulations are applied in ways to obtain a flat or parallel orientation with the surface. A variable characterizing this particle orientation in paint is called flop, and is calculated from color measurements (L values) obtained at different angles from the light source. Duplicating this metallic appearance inexpensively with a polymer surface skin system that has the other necessary surface attributes of high gloss, durability in outdoor exposure, chemical resistance, impact resistance, layer adhesion, temperature resistance and other properties has met very limited success based on a very small decorated surface market share for plastic colored skins.

Decorative composite surfacing films made from a liquid solvent or dispersion system such as those disclosed in U.S. Pat. Nos. 4,810,540; 4,931,324; 4,943,680; and 5,342,666 have been used. Dry paint transfer products such as those taught in U.S. Pat. No. 5,707,697 have been used. U.S. Pat. No. 5,985,079 teaches melt extrusion coating as a zero-solvent approach to clear coat production and co-extrusion as an approach to base coat/clear coat production for certain colors. EP 0 949 120 A1 presents a flexible, weatherable decorative sheet material that has an extruded base layer with a clear outer layer of extruded film as an overlay. A color adjustment layer of printing ink can be included between the base layer and the clear coat.

Reissue of U.S. Pat. No. 5,514,427 (Re. 36,457) purports to solve the problems presented by the PVC and films such as the Tedlar® films marketed by E.I. du Pont de Nemours and Company through the use of a substantially molecularly unoriented cast polymer film prepared by liquid casting methods. Typically these liquid cast films require multiple step processes to provide sheet attributes suitable for thermoforming and adhesion properties for injection cladding, as surface skins that provide a paint-like appearance. Often in these films, the polymer, pigment and effect particles are cast onto a high gloss film from a solution followed by solvent evaporation. In other film constructions, the pigment and effect particles may be printed onto the surface in order to provide the desired metallic effect orientation and appearance such as provided by a paint. Often though these films are not commercialized due to uneconomical cost in materials or processing or deficient attributes such as appearance degradation after thermoforming due to the thin pigment carrying layer or the thin pigment layer streaking after elongation.

Another approach has been to make a "solid" part with molded-in color. Bexloy®W automotive engineering resin, a blend of ionomer and polyethylene sometimes reinforced by glass fiber, marketed by E.I. du Pont de Nemours and Company, for instance, has found increasing use in molded parts such as automobile bumpers. Solid color can be incorporated into the material, but success in incorporating metallic colors has been limited. Also, paint adherence to Bexloy®W resin is poor and paint application that requires use of high temperature paint baking ovens (Original Equipment Manufacturing "OEM" Painting) is not feasible since Bexloy®W lacks suitable high temperature properties. To enhance mar resistance, a light grain is typically applied to this material resulting in a loss of "Distinctness of Image" (DOI), a key index used to evaluate the perceived quality of an exterior finish in the automotive industry.

Another "solid" material that has been used is Surlyn® Reflections Series™ resins, an ionomer-polyamide blend, marketed by E.I. du Pont de Nemours and Company. Molded parts made from this engineering material retain important performance characteristics of the Bexloy® W, have high gloss exhibiting DOI's at least comparable to the best of paint finishes on smooth or "Class A" surfaces, particularly DOI's over 80 and as high as 90 to 95. Solid and metallic colors can be incorporated and parts can be painted. High temperature properties are sufficient to permit OEM Painting without the need for special jigs or hangers to maintain part shape during the bake step. See U.S. Pat. No. 5,866,658.

By molding in color, certain capital, operating, and pollution abatement costs, particularly those associated with paint and solvent systems, can be eliminated. The solid parts have more durability and exhibit fewer defects as a result of weathering, chemical attack, and chipping than painted parts in use. However, they can exhibit splay, ghosting, flow lines and, in the case of a flake or particle with an aspect ratio, "metallic flow lines" which are often objectionable flow induced visual imperfections that particles in the polymer highlight due to light reflection and scatter. Solid injection molded parts can be uneconomical since the higher value polymer that provides the desired surface attributes is typically much thicker than needed to provide just the attributes of the surface, and in many cases the entire thickness of the part may be the higher value polymer.

Japanese patent application (Kokai) No. SHO 58 (1983)-155953, teaches the concept of making a laminated molding body with a polyolefin layer and a surface layer made from a metal salt of an ethylene-α,β-unsaturated carboxylic acid copolymer having a glossy surface after lamination. Although the reference teach generally that there are no special limitation on the method used for laminating the base layer (polyolefin) to the surface layer (ionomer) with or without an intermediate adhesive layer which included co-extrusion, the working examples deal exclusively with hot pressing a commercial grade ionomer film (Surlyn® A1652) to a 2 mm thick polyolefin sheet of polypropylene or ethylene-propylene block copolymer. Also, the fabrication of the case-shaped product involved preheating the laminated sheet and vacuum molding on the side opposite the die. No mention of multilayer, co-extruded, ionomer film or sheet and any advantage of the same is present in this prior art reference.

BRIEF SUMMARY OF THE INVENTION

The present invention generally relates to a multilayer ionomeric thermoplastic sheet (skin) for surfacing polymer parts (or other substrates including metal) to provide a high quality surface appearance, such as one suitable for interior or exterior automotive parts, appliance panels, general aviation applications and the like. The sheet exhibits a colored appearance similar to a surface which is painted with a solid color or a color containing particles that provide a "special effect" to the appearance often referred to as a metallic paint appearance. The novel methods of fabricating a part according to the instant invention using the decorative sheet involve both extruded monolayer and multilayer sheeting, particularly co-extruded, sheets having an ionomeric or ionomer-polyamide blend top surface layer co-extruded onto a selected second polymer layer. Shaped articles made by thermoforming multilayer co-extruded ionomeric sheets (particularly those having sufficient thickness to be self-supporting), and articles formed by back-filling the decorative thermoplastic monolayer sheet or co-extruded sheet according to the methods of the instant invention have a high quality surface appearance comparable to a high quality automotive paint finish. The present invention also provides methods for forming shaped polymer articles with the decorative skin sheet on the outer surface thereof.

Among other features, the present invention allows reduced manufacturing cost, reduced material costs, and appearance enhancement through controlled particle orientation and combination of material clarity and translucent pigment use with effect particles. In one embodiment, manufacturing of shaped articles can be accomplished in fewer steps than conventional "dry paint film" by feeding the extruded thermoplastic sheet of the present invention, preferably preheated, directly into an injection cladding mold for backfilling from a roll of flat sheet that hasn't been preformed. Sheeting of this invention reduces surface imperfections such as ghosting, flow lines, and glass marks, and metallic appearance problems associated with injection molded parts. It overcomes the processing drawbacks of some fluoropolymer containing skin films in deeper draw thermoforming such as streaking. The present invention allows great flexibility and improved economy in making parts with Class A surface by using backfill materials with the thermoformable surface sheet. Finished part properties and costs can be tailored by varying the backfill material, by adding stiffening or other components to the backfill material, by special processing of the backfilling material (e.g., foaming) or by trim or off quality material inclusion in the backfill material.

The decorative sheet of the present invention is a multilayer sheet wherein the top layer of the multilayer sheet comprises an ionomer or ionomer-polyamide blend. The thermoformable sheet can be made in a sheet multilayer melt extrusion process with pigment and flake particles in the surface layer or other layers of the sheet extrusion process. In the case of an ionomer surfaced sheet construction, a patterned or designed film or sheet can be extrusion coated with or laminated to the ionomer sheet with the design or pattern showing through.

The process for making sheet with the ionomer or ionomer-polyamide blend surface layer overcomes deficiencies and economic constraints of existing polymer based "paint films". Multilayer sheet co-extrusion processing provides pigment carrying layers of sufficient thickness that they maintain appearance and hiding power following deep draw thermoforming, control of machine direction effect particle orientation to allow satisfactory replication of paint appearance and one step processing (excluding subsequent thermoforming, cladding, and/or trimming steps etc.) which improves the economics for competition with paint systems.

The shaped plastic article of the present invention has a high quality surface appearance comparable to a high quality automotive paint finish. It can be a thermoformed sheet or a back-filled thermoplastic sheet.

Thus the present invention provides multilayer film or sheet comprising:
  a.) a first co-extruded polymeric layer consisting essentially of ionomer; and
  b.) at least one co-extruded second polymeric layer selected from the group consisting of ionomer, ionomer-polyethylene blend, and ionomer-polyamide blend in contact with the first co-extruded polymeric layer.

The present invention further provides a multi layer film or sheet comprising either:
  a.) a first co-extruded polymeric layer consisting essentially of ionomer; and
  b.) at least one co-extruded second polymeric layer consisting essentially of very low density polyethylene in contact with the first co-extruded polymeric layer; or
  a.) a first co-extruded polymeric layer consisting essentially of ionomer; and
  b.) at least one co-extruded second polymeric sheet layer consisting essentially of ethylene polar copolymer in contact with the first co-extruded polymeric layer; or
  a.) a first co-extrusion polymeric layer consisting essentially of ionomer-polyamide blend; and
  b.) at least one additional co-extruded second polymeric layer in contact with the first co-extrude polymeric layer.

In each of the above embodiments the multilayer film or sheet may further comprise at least one additional co-extruded third polymeric layer in contact with the second co-extruded polymeric layer. The ethylene polar copolymer co-extruded second layer is preferably an acid functionalized copolymer when the top surface is an ionomer layer. The second polymeric layer is preferably a maleic anhydride functionalized polymer when the top surface layer is an ionomer-polyamide blend co-extruded. Preferably one or more of the co-extruded polymeric layers contain pigments, dyes, flakes, or mixtures thereof.

The ionomer preferably consists essentially of a copolymer derived from ethylene and $\alpha,\beta$-ethenically unsaturated $C_3$ to $C_8$ carboxylic acid wherein the copolymer is partially neutralized with metal ions. The ionomer-polyamide blend consists essentially of one or more polyamide which forms a continuous phase or co-continuous phase with one or more ionomer dispersed therein, the ionomer is present in the range from 60 to 40 weight percent and the polyamide is present in the range from 40 to 60 weight percent based on the total weight of ionomer and polyamide, the ionomer consisting essentially of a copolymer derived from ethylene and $\alpha,\beta$-ethenically unsaturated $C_3$ to $C_8$ carboxylic acid wherein the copolymer is partially neutralized with metal ions; wherein the average acid content of copolymer prior to neutralization is present in a sufficiently high percentage such that neutralization in the range of 55 to 100 mole percent of the acid present at melt temperature with one or more metal cations increases the viscosity of the ionomer above that of the polyamide.

The present invention further provides a process for making shaped article having an ionomer or ionomer-polyamide blend as a top surface comprising the steps of:
 a.) positioning a monolayer sheet of ionomer or ionomer-polyamide blend or a multilayer co-extruded sheet into a mold, wherein the thickness of the monolayer sheet or the multilayer sheet is from 8 to 60 mils and wherein the multilayer sheet comprises;
  i.) a first co-extruded polymeric layer selected from the group consisting of ionomer and ionomer-polyamide blend; and
  ii.) at least one additional co-extruded second polymeric layer in contact with the first co-extruded polymeric layer; and
 b.) injection backfilling the monolayer sheet or multilayer co-extruded sheet with a suitable backfilling material.

Preferably the sheet is preheated prior to the injection backfilling particularly for thick sheet and sheet of higher melting point ionomer-polyamide blends. In one embodiment of this process the multilayer sheet comprises:
 (i) a first co-extruded polymeric layer consisting essentially of ionomer;
 (ii) a second co-extruded polymeric layer selected from the group consisting of ionomer and ionomer-polyamide blend in contact with the first co-extrude polymeric layer; and
 (iii) at least one additional co-extruded third polymeric layer in contact with the second co-extrude polymeric layer.

The present invention further provides a process for making a thermoformed, multilayer, sheet-surfaced article comprising the steps of:
 a.) positioning a multilayer sheet into a mold, wherein the thickness of the multilayer sheet is from 8 to 60 mils and wherein the multilayer sheet comprises;
  i.) a first co-extruded polymeric layer selected from the group consisting of ionomer and ionomer-polyamide blend; and
  ii.) at least one additional co-extruded second polymeric layer in contact with the first co-extrude polymeric layer; and
 b.) raising the temperature of the sheet sufficiently to soften the multilayer sheet; and
 c.) conforming the softened sheet to the contoured surface of a substrate in the mold.

In one embodiment of this process the multilayer sheet comprises;
 (iv) a first co-extruded polymeric layer consisting essentially of ionomer;
 (v) a second co-extruded polymeric layer selected from the group consisting of ionomer and ionomer-polyamide blend in contact with the first co-extruded polymeric layer; and
 (vi) at least one additional co-extruded third polymeric layer in contact with the second co-extrude polymeric layer.

Thus the present invention provides an article consisting essentially of a substrate to which a multilayer film or sheet is adhered, wherein the multilayer film or sheet comprises either:
 a.) a first co-extruded polymeric layer consisting essentially of ionomer; and
 b.) at least one co-extruded second polymeric layer selected from the group consisting of ionomer, ionomer-polyethylene blend, and ionomer-polyamide blend in contact with the first co-extruded polymeric layer; or
 a.) a first co-extruded polymeric layer consisting essentially of ionomer; and
 b.) at least one co-extruded second polymeric consisting essentially of very low density polyethylene in contact with the first co-extruded polymeric layer; or
 a.) a first co-extruded polymeric layer consisting essentially of ionomer; and
 b.) at least one co-extruded second polymeric sheet layer consisting essentially of ethylene polar copolymer in contact with the first co-extruded polymeric layer; or
 a.) a first co-extrusion polymeric layer consisting essentially of ionomer-polyamide blend; and
 b.) at least one additional co-extruded second polymeric layer in contact with the first co-extrude polymeric layer.

DETAILED DESCRIPTION OF THE INVENTION

For purposes of this invention the following terms are to be defined as follows:
1. "Copolymer" means polymers containing two or more monomers and as such the term is intended to include both "bipolymer" and "terpolymer" as well as polymers produced from more than three comonomers. The terms "bipolymer" and "terpolymer" mean polymers containing only two and three monomers respectively. The phrase "copolymer of various monomers" means a copolymer whose units are derived from the various monomers.
2. "(Meth)acrylic acid" means acrylic acid and methacrylic acid, and the term "(meth)acrylate" means acrylate and methacrylate.
3. "Consisting essentially of" means that the recited components are essential, while smaller amounts of other components may be present to the extent that they do not detract from the operability of the present invention.
4. "Distinctness of Image" (DOI) is a measure of the "crispness" or "degree of definition" of a reflection of a object in a colored finish compared to the actual object itself. (DOI) is defined in ASTM Standard-284 as: distinctness-of-image-gloss, n-aspect of gloss characterized by the sharpness of images of objects produced by reflection at a surface. DOI can be measured with a BYK-Gardner Wavescan doi instrument bases on U.S. Pat. No. 1,155,558. In the automotive industry, satisfactory finishes on a smooth or "Class A" surface typically will have a finish with a DOI value of at least 60, preferably 80 or higher.
5. Flop is an expression and a calculated variable used to describe or characterize appearance change with viewing angle. In its calculated term context, it is calculated from color measurement L values at 3 different angles from a light source. The higher the flop value, the greater the appearance change in viewing at different angles.
6. Effect particle is a particle added to paints or pigments which provides an appearance effect or change in color with view angle. Typical effect particles are aluminum flakes and mica particles. Often effect particles are flat and thin and their orientation can be important in imparting a certain appearance.
7. Machine direction (MD) means the orientation in a film which is in the direction, either upstream or downstream, that the film is exiting the machine or die. The MD direction can be referred to as either pointing into the machine or away from the machine, 180 degrees apart. The term can be associated with film length. This is in contrast to the cross machine direction or "TD" direction which is the direction 90 degrees from the machine direction or exit flow direction and typically indicates the direction across the film width from one side to the other side.
8. CIELAB color difference is defined in ASTM Standard-284 as, n-color difference calculated by using the CIE 1976 L*a*b* opponent color scales, based on applying a cube-root transformation to CIE tristimulus values X, Y, Z.
9. Gloss is defined in ASTM Standard-284 as, n-angular selectivity of reflectance, involving surface reflected light, responsible for the degree to which reflected highlights or images of objects may be superimposed on a surface.
10. Haze is defined in ASTM Standard 284 as: n-scattering of light at the glossy surface of a specimen responsible for the apparent reduction in contrast of objects viewed by reflection from the surface.
11. A Class A surface is a surface that by itself of when painted results in DOI, gloss and haze readings of 80, 90, 10.

It should be further appreciated that for purposed of the present invention, the use of the expressions multilayer film and the multilayer sheet refer collectively to polymeric films and sheets that are from about 1 mil to about 60 mils thick. Although no single thickness dimension is felt to represent a demarcation between film and sheet, for purposes of this invention the use of the word sheet, in both the processes for making a shaped article involving backfilling of sheet and for making a thermoformed article from sheet, refers to polymeric material of 8 to 60 mils thick.

Film Process

Lamination and melt extrusion processes known in the art can make the thermoformable sheet of the present invention. Multilayer sheets can be made on extrusion lines that may be configured and operated in ways known in the art. The monolayer or multilayer sheets of the present invention may be laminated or coated as the surface layer onto other substrate sheets to form decorative sheet structures.

In a typical extrusion system, selected solid plastic particles in pellet form are fed to an extruder, melted and plasticated, pumped through a transfer pipe into a feedblock and then to an extrusion die or directly to a die. The molten curtain that exits the die is deposited onto a moving roller which transfers the solidifying polymer through a gap or nip between two counter-rotating rollers to a third roller and subsequently through another nip system between rollers which pulls the sheet through the take-off system. The sheet is subsequently rolled onto a core creating a roll of sheet or the sheet can be cut to a length and stacked as flat sheets.

In a typical system for making multilayer sheet, there are multiple extruders into which particles are fed, melted and plasticated by the extruder screw and heated barrel system. The resulting molten mass can be pumped through a transfer pipe into a co-extrusion feedblock for the purpose of combining the flows into contacting layers. The feedblock can be equipped with a plug that can be changed to allow different combinations of extruders and layers to be run on the line. The plug routes the flows within the feedblock and combines the layers prior to exiting the feedblock and going into an extrusion die. The extrusion die has a flow area or manifold that widens and thins the single or multilayer melt flow into a thinner, wider web or melt curtain. The multilayer molten flow is widened and thinned to the die flow width and die gap opening.

The "match" in rheology between the layers will determine how well the layers spread together in the die. If there is a significant difference in flow properties, the layers may not all flow to the width of the die. In this case, lower viscosity material may flow to the end of the die opening and higher viscosity material flow width will be less. If the layer flow properties are well matched, each layer will flow to the full width of the die. Finally, if the flow properties are poorly matched, quality sheeting may not be produced due to flow instabilities between layers in the die and air gap exit the die.

Alternatively, a different type of extrusion die, a multiple manifold die, can be used in place of the "extrusion feed block and single manifold die" arrangement. In this case, separate extruder melt streams flow directly into separate flow paths or manifolds within a multiple manifold die. Each layer in this case flows through its own manifold and is spread and thinned to the width of the die flow area prior to the layers combining and flowing together into a multilayer molten sheet. The combination of layers in this case, occurs near the die exit after each layer has been thinned and widened separately and is therefore less sensitive to mismatch in flow properties. In a similar fashion, more than 1 layer can be fed into a separate manifold where the multiple layers can be spread and thinned in the manifold.

The molten flow exits the die as a molten curtain and flows onto a metal roller just prior to contacting a larger diameter roll. These rolls are counter rotating. The gap between these rollers is set to provide a uniform opening, referred to as a nip. The molten plastic contacts both rolls as it is conveyed through the controlled opening gap. The roll arrangement provides a higher glossy finish on the sheet and more uniform thickness to the sheet. The primary roller is a highly polished roll that is contacted by the sheet for approximately half of its circumference prior to releasing the solidifying plastic typically to a third roll downstream in the takeoff roller system. The sheet is subsequently taken through another nip system between rollers which pulls the sheet in the system. The sheet is subsequently rolled onto a core creating a roll of sheet or alternatively can be cut to length and stacked.

In practice, there are several alternatives for the molten flow exiting the die. For example, the die can be repositioned to drop the molten curtain so as to contact the larger roll initially just prior to the nip. Another example arrangement positions the die at angles between vertical and horizontal to result in vertical or horizontal molten flow from the die. Also, instead of a second roll providing a nip, other means can be used to force the molten plastic onto a roll such as air flow pushing the molten web onto a roller.

Co-Extrusion Sheet:

The appearance of sheet from the sheet process can have several variables that effect its appearance and performance. The sheet can have a clear surface layer with under layers containing pigments and effect particles in the case of the ionomer sheet or it can have a pigmented surface layer with or without effect particles as is the case with the ionomer-polyamide blend. One or more of the under layers in either case may contain pigment or particles.

The sheet appearance can be changed with the blend of pigments used and with the orientation of the effect particles if they are present. Ideally for solid color pigmentation only, the color would not change based on viewing direction for a flat sheet if the purpose is to match a typical paint appearance surface. However, effect particles in sheet extrusion encounter multi axial particle orientation that effects color and appearance. It has been found that orientation of the flake particles toward a particle that is closer to parallel with the surface can be controlled in sheet extrusion to a certain extent with the proper equipment and operating techniques. This is necessary to provide a closer match to painted surfaces, to minimize color difference based on viewing direction and to minimize color differences between a pigmented sheet product and a painted surface.

It has been found that flop value differences calculated from color measurements in the upstream and downstream MD directions of a sheet product could be minimized which in turn minimizes color differences based on viewing direction. A single manifold die with the gap opened to a significant degree provided flop difference values of less than about 2 whereas when the die is run with a die gap opening considered more typical, flop values were approximately 4. The die does not have a short land length. On another die with 2 manifolds and a short die land length, flop differences were found to be higher than 3 at typical, low and high gap settings and not effected by gap. Based on this preliminary limited data particle orientation characterized by flop calculations, can be effected by a combination of both die gap and die exit characteristics.

Metallic appearance can be effected through a combination of layer inherent clarity, translucent pigments and effect particles used in a layer which in combination allows flat metallic surfaces to be seen with less light scattering and to a greater depth enhancing appearance and accentuating the flop or change in appearance with viewing angle that is a desirable attribute. To provide hiding power so undesirable light reflection from underlying surfaces or layers are minimized, a thick layer carrying the pigment and flake can be employed, or a higher concentration of pigment and flake can be used or an under layer with pigment and/or flake can be utilized to effect appearance.

The combination of clear/color layers of either ionomer-ionomer or ionomer-acid copolymer as the first two layers in the sheet provide the desirable characteristics of the surface layer with mar resistance, high clarity, durable in outdoor exposure, chemical resistance and high gloss in combination with a second clear layer that has good compatibility for adhesion, minimum distortions from interface disturbances that can be caused be flow differences and appearance attributes described above. In addition, ionomer over other layer materials such as EVA's or E-acrylates or PE type materials may also provide a satisfactory appearance system although these systems may not provide the high levels of adhesion or the depth and distinctiveness of metallic particle reflection.

Additives that go into the appearance layers may require compatible carriers to minimize resultant haze that can be generated by material incompatibility causing light refraction at the incompatible interface. Additives include pigment or effect particle carriers, UV additive carriers or anti-static additive carriers. Compatible carrier materials include ionomer, acid copolymer, EVA, E-acrylate copolymers or derivatives.

Thermoformable Skin

The thermoformable skin of the present invention has attributes that can include good formability and release from tooling in thermoforming, excellent DOI, high gloss and low haze surface appearance, solid and metallic color appearance, good mar and scratch resistance, good weatherability, good impact resistance and good chemical resistance. It may be formed into a weatherable, decorative sheet for surfacing polymer parts. The sheet is surfaced with an ionomer or ionomer-polyamide blend.

The ionomers and the ionomer-polyamide blends useful in the present invention are described below. The decorative sheet can be monolayer or multilayer. When a multilayer, at least the top layer of the multilayer sheet is made from the ionomer or ionomer-polyamide blend.

The monolayer sheets preferably are about 1 to about 50, alternatively about 2 to about 20, mils thick. The multilayer sheets preferably are about 8 to about 60, alternatively about 12 to about 40 mils thick. However it should be appreciated that thicker dimension such as 60 to 400 mils, alternatively 80 to 180, can be easily achieved and retain many of the benefits of the instant invention for thermoforming larger parts requiring greater stiffness.

Multilayer skin films can be tailored to fit the needs of a wide variety of specific applications. For example, layers in the skin structure can provide pigmented solid color, pearlescent pigment and/or other nacreous pigment for colored metallic appearance properties (see U.S. Pat. No. 6,060,135 and in particular column 4, lines 25-40, incorporated herein by reference), stiffness for handling, thermoforming properties, layer adhesion function and a back side layer which will adhere to a backfill material to form a shaped molded article.

Some typical skin constructions include (where slash mark represents layer interface and parentheses designate additive):

Ionomer monolayer (clear or pigmented)
Ionomer-polyamide blend monolayer (pigmented)
Ionomer (clear)/polyethylene-ionomer blend (pigmented)
Ionomer (clear)/polyethylene-elastomer blend (pigmented)
Ionomer (clear)/ionomer (pigmented)/ethylene copolymer
Ionomer (clear)/ionomer (pigmented)/very low density polyethylene
Ionomer (clear)/ethylene acid copolymer (pigmented)/very low density polyethylene (pigmented)
Ionomer (clear)/ethylene acid copolymer (pigmented)/very low density polyethylene/olefinic thermoplastic
Ionomer (pigmented)/ionomer (pigmented)/ethylene acid copolymer
Ionomer (pigmented)/ethylene acid copolymer
Ionomer (pigmented)/terpolymer ethylene-acid-acrylate (pigmented)/olefinic thermoplastic
Ionomer (pigmented)/terpolymer ethylene-acrylate-glycidal methacrylate (pigmented)/olefinic thermoplastic
Ionomer (clear)/terpolymer ethylene-acid-acrylate (pigmented)/olefinic thermoplastic Ionomer (clear)/terpolymer ethylene-acrylate-glycidal methacrylate (pigmented)/olefinic thermoplastic Ionomer (clear)/ionomer (pigmented)/terpolymer ethylene-acrylate-glycidal methacrylate/olefinic thermoplastic Ionomer (clear)/ethylene-acrylate copolymer (pigmented)/ethylene copolymer Ionomer (clear)/ionomer (pigmented)/ethylene copolymer/polyethylene Ionomer (clear)/ionomer (pigmented)/ethylene copolymer/polyester copolymer Ionomer (clear)/ionomer (pigmented)/polyamide (pigmented)

Ionomer (clear)/ionomer (pigmented)/tie layer (pigmented)/thermoplastic polyolefin Ionomer (clear)/ionomer (pigmented)/tie layer/thermoplastic polyolefin (pigmented)

Ionomer (clear)/ionomer (pigmented)/polyethylene-ionomer blend

Ionomer (clear)/ionomer (pigmented)/tie/nitrile copolymer

Ionomer-polyamide blend/tie/thermoplastic polyolefin

Ionomer-polyamide blend/tie/polyester copolymer

Ionomer-polyamide blend/tie/nitrite copolymer

Ionomer-polyamide blend/polyamide copolymer

Ionomer (clear)/ionomer (pigmented)/tie layer/thermoplastic polyolefin,

Ionomer/ionomer (pigmented)/tie layer/polyester copolymer,

Ionomer/ionomer (pigmented)/tie layer/recycle/tie layer/polyester copolymer,

Ionomer/polyamide (pigmented)/tie layer/polyester, and

Ionomer/polyamide (pigmented)/tie layer/recycle/polyester copolymer.

The decorative sheet may be adhered to a wide variety of substrates to provide a high quality surface appearance, such as one suitable for interior or exterior automotive parts or other panels. It may be used as decorative "thin" surface layer on "thick part" plastic substrates that can be subsequently thermoformed into an article.

Pigmented ionomer-polyamide blend and clear ionomer over a pigmented substrate can provide valuable surface attributes for plastic parts, especially those that are now painted.

Optionally, pigment and/or flake particles may be included in the surface layer or other layers in the case of a multilayer sheet process. In the case of an ionomer sheet construction, the ionomer can be coated or laminated onto a patterned or designed film or sheet with the design or pattern showing through.

The high temperature properties of the ionomer-polyamide blend are sufficient to permit OEM Painting of molded parts without the need for special jigs or hangers to maintain part shape during the bake step.

Shaped Article Forming Process

Shaped articles employing the decorative thermoplastic sheet of the present invention can be made by processes known in the art including injection cladding, compression molding and direct thermoforming. The decorative thermoplastic sheet can also be laminated onto a substrate to form an article.

A particularly useful method is injection cladding such as described in U.S. Pat. No. 5,725,712 (incorporated herein by reference, see columns 16 through 20). The decorative thermoplastic sheet or co-extruded sheet can be back-filled with a wide variety of backfill materials. The flat sheet, preferably preheated, can be moved directly into an injection cladding mold for back-filling without thermoforming the sheet first. By preheating, deep-draw shapes can be made without creasing problems.

Direct thermoforming is particularly useful when the sheet being thermoformed by itself is sufficiently thick to provide stiffness and rigidity needed by the article. Particularly useful for making such directly thermoformed articles are co-extruded sheets with surface materials of ionomer or ionomer-polyamide blend.

A relatively thin (typically, 15-50 mils) decorative sheet can be thermoformed into a mold's shape and inserted into an injection mold or sheet molding compound (SMC) compression mold for cladding in a two step process.

When using the decorative sheet made from ionomer, it has been found that it is not necessary to maintain the gloss of the sheet from start to finish, as it is in "paint film" systems. Instead, the surface gloss of ionomers with a low temperature softening point can be improved in final back-filling step as the film contacts the polished surface of the injection molding tool in the back-filling step. This property overcomes skin handling mars, reduces skin sheet handling costs and provides for a more flexible and robust process. Preferably, the temperature of the injection molding tool should be from about 10 to about 50° C. The temperature of the back-filling molten polymer should be sufficiently high to soften the ionomer or ionomer-polyamide skin so that it conforms well to the mold and picks up a high gloss.

Shaped Plastic Article

The thermoformable skin discussed above can be formed into a shaped polymer article with the decorative skin on the outer surface thereof. Shaped articles of this invention include automobile body panels, mirrors, accent pieces, grills, hoods, sport utility vehicle body panels, appliance panels and the like. The shaped polymer articles of this invention particularly are ones presenting a high quality surface appearance comparable to a high quality automotive paint finish. They exhibit high gloss, low gloss, or textured appearance and improved mar resistance. These molded articles typically exhibit DOI's of at least 80 and frequently as high as 90 to 95. Solid and metallic colors can be incorporated and parts can be painted.

Shaped articles employing the thermoformable sheet of this invention as a top layer, particularly with the addition of standard UV stabilizers for the ionomer and ionomer-polyamide blend, exhibit good weatherability, being particularly stable when exposed to ultraviolet light for extended periods of time. These articles exhibit the low color shift, measured using, for example, the CIE 1976 (CIE LAB) color scale, needed for molded parts used in exterior applications. They exhibit $\Delta E$ color shift values of less than about 3 (a level considered as suitable for exterior automotive applications) when exposed to 2500 kilojoules/square meter in a Xenon-arc weatherometer (SAE J1960). Improved automobile fascia having DOI of at least 80 and superior mar resistance can be made employing the thermoformable sheet of this invention.

Ionomer

The ionomers of the present invention are derived from direct copolymers of ethylene and $\alpha,\beta$ ethenically unsaturated $C_3$-$C_8$ carboxylic acid ("ethylene-acid copolymers") by neutralization with metal ions. By "direct copolymer", it is meant that the copolymer is made by polymerization of monomers together at the same time, as distinct from a "graft copolymer" where a monomer is attached or polymerized onto an existing polymer chain. Methods of preparing such ionomers are well known and are described in U.S. Pat. No. 3,264,272 (incorporated herein by reference). Preparation of the direct ethylene-acid copolymers on which the ionomers are based is described in U.S. Pat. No. 4,351,931 (incorporated herein by reference). Ethylene-acid copolymers with high levels of acid are difficult to prepare in a continuous polymerizer because of monomer-polymer phase separation. This difficulty can be avoided however by use of "cosolvent technology" as described in U.S. Pat. No. 5,028,674 (incorporated herein by reference) or by employing somewhat higher pressures than those at which copolymers with lower acid can be prepared.

The ethylene-acid copolymers used to make the ionomeric copolymer of this invention can be E/X/Y copolymers where E is ethylene; X is a softening comonomer and Y is the $\alpha,\beta$-ethenically unsaturated $C_3$-$C_8$ carboxylic acid, particularly acrylic or methacrylic acid. Preferably, however, the ethylene-acid copolymer is a dipolymer (no softening comonomer). The preferred acid moieties are methacrylic acid and acrylic acid.

By "softening", it is meant that the polymer is made less crystalline. Suitable "softening" comonomers (X) are monomers selected from alkyl acrylate, and alkyl methacrylate, wherein the alkyl groups have from 1-12 carbon atoms which, when present, may be up to 30 (preferably up to 25, most preferably up to 12) wt. % of the ethylene-acid copolymer.

Preferred ethylene-acid dipolymers are ethylene-acrylic acid and ethylene-methacrylic acid. Specific other copolymers include ethylene-n-butyl acrylate-acrylic acid, ethylene-n-butyl acrylate-methacrylic acid, ethylene-iso-butyl acrylate-methacrylic acid, ethylene-iso-butyl acrylate-acrylic acid, ethylene-n-butyl methacrylate-methacrylic acid, ethylene-methyl methacrylate-acrylic acid, ethylene-methyl acrylate-acrylic acid, ethylene-methyl acrylate-methacrylic acid, ethylene-methyl methacrylate-methacrylic acid, and ethylene-n-butyl methacrylate-acrylic acid (where the dash represents comonomers).

The mole percent acid moiety (i.e., mole percent of carboxyl group, —COOH, relative to an elemental mole basis) in the ethylene-acid copolymer prior to neutralization in the ionomer employed by itself as a layer preferably is 0.54 to 1.26%, alternately 0.68 to 1.11%, or 0.82 to 0.96% and the degree of neutralization preferably is 30 to 100%, alternately 40 to 80%, or 45 to 70%. On a polymer mole basis, the mole percent acid moiety in the ethylene-acid copolymer prior to neutralization in the ionomer employed by itself as a layer preferably is 3.3 to 8.3%, alternatively 4.1 to 7.2%, or 4.6 to 6.2% and the degree of neutralization preferably is 25 to 100%, alternatively 35 to 80%, or 45 to 70%. Higher percent acid and higher neutralization is preferred to obtain improved mar-resistance and clarity or wet look in clear ionomer constructions for decorative surfaces. For ethylene-methacrylic-acid copolymers, the weight percent methacrylic acid is preferably greater than 8%, more preferably greater than 10%, alternatively greater than 12%, preferably in the range of 13-19%. For ethylene-acrylic acid copolymers, the percent acrylic acid is preferably greater than 7%, more preferably greater than 9%, alternatively greater than 10%, preferably in the range of 11-17%. A blend of ionomers can also be employed to enhance mar performance and yet maintain adequate temperature resistance.

While the neutralizing agent (e.g., zinc oxide, magnesium oxide, and calcium oxide) can be added in solid form, it preferably is added as a concentrate in an ethylene-acid copolymer carrier. This concentrate is made by carefully selecting the ethylene-acid copolymer and the blending conditions to assure that the neutralizing agent does not significantly neutralize the carrier. This neutralizing concentrate can also contain small amounts (up to about 2 wt. %) of one or more salts of the metal cations (e.g. acetates and stearates).

The acid copolymer can be neutralized with a mixture of ions by using different neutralizing agents which can provide enhanced mar resistance.

The ionomers of this invention are clear and have low haze levels. They also have outstanding melt strength at thermoforming temperatures employed with these skins allowing large parts with deep draws to be formed.

The ionomer layer(s) can degrade and crack during UV exposure. Suitable UV additives such as hindered amines light stabilizers, UV light absorbers along with other suitable stabilizers can increase the layers durability and appearance to withstand extended outdoor exposure.

The surface ionomer layer attracts dust due to electrostatic surface charges. Adding anti-stat additives to the top layer and the second layer can reduce dust sticking which enhances sheet processing and reduces the potential for surface imperfections in the final article.

Ionomer-Polyamide Blend

The ionomer-polyamide blend used in the present invention is one or more polyamides with one or more ionomers, wherein the ionomer is dispersed in a continuous (or co-continuous) polyamide phase. It preferably is made by the process taught in U.S. Pat. No. 5,866,658 (incorporated herein by reference).

The ionomer(s), as more fully set forth above, are preferably direct copolymer(s) comprising ethylene and $\alpha,\beta$-ethenically-unsaturated $C_3$-$C_8$ carboxylic acid wherein the average acid of the direct copolymer(s) prior to neutralization is present in a high percentage and wherein 55 to 100 mole percent of the acid is neutralized with one or more metal cations. Preferably the unsaturated $C_3$-$C_8$ carboxylic acid is methacrylic acid making up 15 to 25 weight percent of the direct copolymer of ethylene and methacrylic acid or acrylic acid making up 14 to 25 weight percent of the direct copolymer of ethylene and acrylic acid. Preferably the metal cation used to neutralize the carboxylic acid also interacts with the amide links of the polyamide. Preferably zinc is used.

The ethylene-acid copolymers used to make the ionomeric copolymers employed in the ionomer-polyamide blends of this invention have the acid moiety present in a high amount. The amount that will be considered as "high" will depend on which acid moiety is employed, particularly the molecular weight of the acid moiety. In the case of ethylene-methacrylic acid, the preferred acid level is 13 to 25, (preferably 14 to 25, more preferably 15 to 22) wt. % of the copolymer. In the case of ethylene-acrylic acid, the preferred acid level is 8 to 25, (preferably 9 to 25, more preferably 10 to 22) wt. % of the copolymer. Particularly in view of the disclosures herein, one skilled in the art will be able to determine the "high" acid levels for other acid moieties that are needed to get the desired gloss levels and abrasion resistance.

It will be recognized that it is possible to blend more than one copolymer, the acid level of any one or more being outside the "high" range of the invention, to obtain an average acid level prior to neutralization that is within the preferred high percentage acid levels. Preferably, in the case of blends, the weight percent acid in each acid copolymer from which the ionomer components are derived should be close to the preferred range, and most preferably they should be within this range.

The acid moiety is preferably highly neutralized by metal cations, particularly monovalent and/or divalent metal cations. It is preferable to neutralize with metal cations that are compatible with the nylon, that is, with cations that also interact with the amide links of the polyamide. Preferred metal cations include sodium, lithium, magnesium, calcium, and zinc, or a combination of such cations. Blends of cations are most preferred. Potassium and sodium are poor choices. Magnesium and calcium preferably are used in combination with zinc.

The polyamide component, as more fully set forth below, preferably has a viscosity under melt-blend conditions that is high enough to provide the mechanical properties but low enough to create the desired phase relationship. The polyamides comprise semicrystalline polyamides, preferably polycaprolamide (nylon 6). It may also comprise a blend of semicrystalline and amorphous polyamides with the amorphous polyamide fraction up to 70% based on total polyamide weight. An amorphous polyamide that can be used is hexamethylenediamine-isophthalamide-terephthalamide terpolymer.

Preferably, the blend is 60 to 40 (more preferably 50 to 45, also 60 to 55) wt. % ionomer and 40 to 60 (more preferably 50 to 55, also 40 to 45) wt. % polyamide (percentages being based on total ionomer and polyamide). Preferably, the ionomer is dispersed in a reasonably uniform manner as small, essentially spherical particles for the most part with average diameter of preferably about 0.1 to about 0.2 μm in a continuous polyamide phase. Also, the ionomer preferably is dispersed as oblong and curvilinear or ellipsoid shaped particles for the most part with an average cross-sectional diameter (minor axis length) of about 0.1 to about 0.2 μm in a co-continuous polyamide phase. The average ratio of major axis length to minor acid length can be about 2 to about 10 or greater.

The blend may also contain components such as ultraviolet (UV) light stabilizers, antioxidants and thermal stabilizers, pigments and dyes, fillers, anti-slip agents, plasticizers, nucleating agents, and the like for both polyamide and ionomer. Preferably, these components are present in amounts of about 1 to about 3 (preferably about 1.5 to about 3) parts per hundred parts by weight of the ionomer-polyamide blend, but may be present in lower or higher levels.

To achieve the desired morphology (ionomer dispersed in continuous or co-continuous nylon phase) using the preferred process, the ionomer must have a sufficiently high acid level and be neutralized to a sufficiently high level to attain a viscosity greater than that of the nylon. The polyamide should have a viscosity higher than that of the ethylene-acid copolymer or ionomer at low neutralization levels, but should be less than the ionomer at high neutralization levels. Preferably, it is made by first blending a partially neutralized, lower viscosity ethylene-acid copolymer with a sufficiently high acid level into the nylon and then further neutralizing sufficiently to raise the ionomer viscosity while melt blending under intense mixing conditions. Non-neutralized (or lowly neutralized), high-acid ethylene-acid copolymer can be melt blended with the polyamide with all of its neutralization being effected during the melt blending. At the high degree of neutralization, the viscosity of the ionomer will exceed that of the polyamide at processing conditions.

The preferred level of neutralization will depend on the ethylene-acid copolymers employed and the properties desired. Neutralization in the blend should be sufficient to raise the melt index (MI) of the ionomer in the blend, measured as grams of ionomer exiting a 0.0823 inch orifice in ten minutes (gm/10 min) at 190° C. with 2160 gram weight applied force (ASTM D-1238 condition E), to such a level that, if the ionomer alone (not in the nylon blend) were neutralized to that level, there would be very low to essentially no flow (preferably less than about 0.2 grams/10 minutes). For example, for an ethylene-acid dipolymer of ethylene and 19 wt. % methacrylic acid, the following MI values result when the dipolymer is neutralized to the degree indicated:

| % Neutralization | MI (gm/10 min) |
|---|---|
| 0 | 60 |
| ~38 | 2.7 |
| ~52-58 | 0.71 |
| ~60 | 0.17 |
| ~67 | 0.13 |
| ~90 | 0 to 0.015 |

In this case the percent neutralization should be about 60% or greater since the grams of ionomer exiting the orifice is less than 0.2 grams per 10 minutes. One skilled in the art can easily determine the preferred percent neutralization for other ionomers. Preferably in the final melt blend with polyamide, the mole percent of acid neutralized is 65 to 100%, more preferably 75 to 100%, alternatively 75 to 85%.

The level of acid and the degree of neutralization can be adjusted to achieve the particular properties desired. Gloss is enhanced by raising the average acid level. High neutralization yields harder, glossier products while more moderate neutralization yields tougher products.

Polyamide

Semicrystalline polyamides can be used in the ionomer-polyamide blends of the present invention. The term "semicrystalline polyamide" is well known to those skilled in the art. Semicrystalline polyamides suitable for this invention are generally prepared from lactams or amino acids or from condensation of diamines such as hexamethylene diamine with dibasic acids such as sebacic acid. Copolymers and terpolymers of these polyamides are also included. Preferred semicrystalline polyamides are polycaprolamide (nylon 6), polyhexamethylene adipamide (nylon 6,6), most preferably nylon 6. Other semicrystalline polyamides useful in the present invention include nylon 11, nylon 12, nylon 12,12 and copolymers and terpolymers such as nylon 6/6,6, nylon 6/6, 10, nylon 6/12, nylon 6,6/12, nylon 6/6,6/6,10 and nylon 6/6T.

Amorphous polyamides can be substituted for some of the semicrystalline polyamide to raise the glass transition temperature (Tg) of the nylon phase and to lower the temperature that this material can be thermoformed at. Up to about 70 wt. %, preferably up to about 25-60 wt. %, of the polyamide phase can be amorphous polyamides. The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute heating rate.

Examples of the amorphous polyamides that can be used include hexamethylenediamine isophthalamide, hexamethylenediamine isophthalamide/terephthalamide terpolymer, having iso/-terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processable amorphous polymer. Amorphous polyamides may contain, as comonomers, minor amounts of lactam species such as caprolactam or lauryl lactam, even though polymers based on these monomers alone are not amorphous as long as they do not impart crystallinity to the polyamide. In addition, up to about 10 wt. % of a liquid or solid plasticizer such as glycerol, sorbitol, mannitol, or aromatic sulfonamide compounds (such as "Santicizer 8" from Monsanto) may be included with the amorphous polyamide.

The amorphous polyamide may be a blend of ethylene vinyl alcohol and amorphous nylon in which the polyamide component comprises about 5 to about 95 wt. % of the total composition of EVOH plus polyamide, preferably about 15 to about 70 wt. %, and most preferably about 15 to about 30 wt. %.

Backfill Material

Backfill materials may include a wide variety of polymers. These materials include thermoplastic polyolefins (TPO), polyesters (PET), sheet molding compounds (SMC), acrylonitrile butyl styrene (ABS), polyvinyl chloride (PVC), polystyrene (PS), polyurethane (PU), Polyethylene including low density polyethylene (LDPE), linear low density polyethylene (LLDPE), or high density polyethylene (HDPE), and others materials. Backfill materials can also incorporate scrap material recycled from the sheet making process.

In injection cladding, alternative backfilling processes can be used with backfill material such as foam generation or gas injection during the backfill injection operation. The high gloss decorative surface can be maintained with these alternative backfill processes or with fillers in the backfill material.

Through proper skin sheet design, surface defects from glass or other fillers in the backfill material can be avoided. Glass type filler, typically used for stiffening, often provides a poor surface finish due to glass showing through at the surface. The use of this skin film can provide an article which has glass in the backing material for stiffening yet with a surface free of glass surface imperfections.

Tie Layer

Tie layers useful in the present invention include those films well known in the art for forming melt-bond layers that adhere to the films or substrates to which they come in contact. Co-extrudable adhesives based on blends of various polyethylenes are well known. For example blends of polyethylene, ethylene/alpha-olefin copolymers, polar ethylene co- or terpolymers and/or ethylene elastomers or rubbers which are adhesive to the ionomer, or an ethylene copolymer which is adhesive to the ionomer-nylon alloy, such as ethylene vinyl acetate (EVA), ethylene (meth)acrylate copolymers (EA and EMA), and ethylene butyl acrylate copolymers (EBA). Others include polypropylene (PP) and maleic anhydride modified polymers including polypropylenes which are adhesive to TPO or PP and ionomer-polyamide blends, or PET or PETG copolymer resins which are adhesive to higher copolymer containing ethylene copolymers, or ionomer-polyamide blends which are adhesive to nylon copolymers such as Elvamide®. Further ethylene based polymer blends, especially copolymers containing anhydride grafts demonstrate improved adhesion to the ionomer-nylon alloy.

Adhesive layers provide delamination resistance between the surface layers and subsequent functional layers during processing and end-use.

Ethylene Polar Copolymers

The ethylene polar copolymers useful in the present invention include generally any polymer derived from copolymerizing ethylene and one or more polar comonomers having and acid or acid related functionality. As such there role as a polymeric layer in a multilayer film or sheet may be similar to the above described tie layer. The ethylene polar copolymers include polymer made by direct copolymerization or by grafting and the like. The acid or acid related functionality typically involves comonomer containing the carboxyl group, esters of the carboxyl group, acid anhydride and the like including vinyl carboxylates such as vinyl acetate. Thus the ethylene polar copolymer includes by way of example (but not limited thereto) polymers such as ethylene copolymers containing maleic anhydride, acrylic acid, methacrylic acid, and various esters of (meth)acrylic acid; i.e., (meth)acrylates. The ethylene polar copolymers also include the EVA type copolymers.

Other Components

Additives normally compounded into plastics may be included in the blend, for example, ultra-violet (UV) stabilizers, UV absorbers, antioxidants, thermal stabilizers, anti-stat additives, processing aids, pigments and the like. When included, these components are preferably present in amounts of about 1 to about 3 (preferably about 1.5 to about 3) parts per hundred parts by weight of the ionomer-polyamide blend but may be present in lower or higher amounts. These components are preferably present in amounts of about 0.3 to about 3 (preferably about 0.6 to about 1.3) parts per hundred parts by weight in the ionomer only surface layer.

Of particular importance if the part is to be exposed to ultraviolet (UV) light is the inclusion of one or more UV stabilizers for the nylon and for the ionomer. Typically useful UV stabilizers include: benzophenones such as hydroxy dodecyloxy benzophenone, 2,4-dihydroxybenzophenone, hydroxybenzophenones containing sulfonic groups and the like; triazoles such as 2-phenyl-4-(2',2'-dihydroxylbenzoyl)-triazoles; substituted benzothiazoles such as hydroxy-phenylthiazoles and the like; triazines such as 3,5-dialkyl-4-hydroxyphenyl derivatives of triazine, sulfur containing derivatives of dialkyl-4-hydroxy phenyl triazines, hydroxy phenyl-1,3,5-triazine and the like; benzoates such as dibenzoate of diphenylol propane, tertiary butyl benzoate of diphenylol propane and the like; and others such as lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester, and hindered amines of bipiperidyl derivatives.

Preferred UV stabilizers and absorbers, all available from Ciba Geigy, are Tinuvin®234 (2-(2H-benzotriazol-2-yl)-4,6-bis(1-methyl-1-phenylethyl)phenol), Tinuvin®327 (2-(3',5'-di-tert-butyl-2'-hydroxyphenyl)-5 chlorobenzotriazole), Tinuvin®328 (2-(2'hydroxy-3',5'-di-tert-amylphenyl)benzotriazole), Tinuvin®329 (2-(2'-hydroxy-5'-tert-octylphenyl) benzotriazole), Tinuvin®765 (bis(1,2,2,6,6-pentamethyl-4-piperidinyl) sebacate), Tinuvin®770 (bis(2,2,6,6-tetramethyl-4-piperidinyl) decanedioate), Tinuvin®928, (Chimassorb 2020 (1,6-Hexanediamine, N,N'-bis(2,2,6,6-tetramethyl-4-piperidinyl)-polymer, Chimassorb 119 (1,3,5-Triazine-2,4,6-triamine,N,N'''-[1,2-ethane-diyl-bis[[[4,6-bis-[butyl (1,2,2,6,6-pentamethyl-4-piperidinyl)amino]-1,3,5-triazine-2-yl]imino]-3,1-propanediyl]]bis[N',N'''-dibutyl-N',N'''-bis(1,2,2,6,6-pentamethyl-4-piperidinyl)- and Chimassorb™944 (N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine).

Preferred thermal stabilizers, all available from Ciba Geigy, are Irganox®259 (hexamethylene bis(3,5-di-tert-butyl-4-hydroxyhydrocinnamate), Irganox®1010 (3,5-bis(1,1-dimethylethyl)-4-hyroxybenzenepropanoic acid, 2,2-bis[[3-[3,5-bis(1,1-dimethylethyl)-4-hydroxyphenyl]-1-oxopropoxy]methyl]1,3-propanediyl ester), Irganox®1076 (octadecyl 3,5-di-tert-butyl-4-hydroxyhydrocinnamate), Iragnox®1098 (N,N'-hexamethylene bis(3,5-di-tert-butyl-4-hydroxyhydrocinnamamide), Irganox®B215 (33/67 blend of Irganox®1010 with tris(2,4-di-tert-butylphenyl)phosphite), Irganox®B225 (50/50 blend of Irganox®1010 with tris(2,4-di-tert-butylphenyl)phosphite), and Irganox®B1171 (50/50 blend of Irganox®1098 with tris(2,4-di-tert-butylphenyl)phosphite).

Preferred processing aids include aluminum distearate and zinc stearate, particularly zinc stearate.

Pigments include both clear pigments such as inorganic siliceous pigments (silica pigments for example) and conventional pigments used in coating compositions. Conventional pigments include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes. Particularly preferred are pigments that are stable at high temperatures.

Pigments are generally formulated into a millbase by mixing the pigments with a dispersing resin that may be the same as or compatible with the material into which the pigment is to be incorporated. Pigment dispersions are formed by conventional means such as sand grinding, ball milling, attritor grinding or two-roll milling.

Other additives, while not generally needed or used, such as fiber glass and mineral fillers, anti-slip agents, plasticizers, nucleating agents, and the like, can be incorporated.

Preferably, the mixing and the degree of neutralization for the ionomer-polyamide blend should be sufficient to bring about the phase inversion (higher volume percent ionomer dispersed in the continuous or co-continuous nylon phase) in the mixing equipment. It should be recognized, however, that full inversion may not occur in the mixing equipment but may result from further working of the blend in injection molding operations for forming plaques and the like.

Tests Used in the Examples

The differential scanning calorimeter (DSC) cooling exotherm can easily and quickly be determined and is a useful indicator of morphology and the sufficiency of mixing conditions for the desired morphology in the ionomer-polyamide blend. The DSC cooling exotherm will differ depending on the nylon used, but can easily be determined by one skilled in the art. Preferably, the DSC cooling exotherm when using nylon 6 should be 160° C. to 180° C. when cooling is carried out at a rapid rate (e.g. 30° C. min.). The presence of this exotherm indicates that the desired phase relationship has been achieved. Higher amorphous polyamide fractions in the ionomer-polyamide blend will reduce this exotherm in enthalpy and temperature.

Tensile tests are also useful indicators of the ionomer-polyamide blend product morphology. When the morphology is correct, the ratio of Tension at Break ($T_B$) at room temperature (23° C.) to $T_B$ at elevated temperature (150° C.) preferably is less than about 12 to 15.

EXAMPLES

The following Examples show various aspects of this invention.

The multilayer sheets in the examples were made on a co-extrusion line that has 4 extruders and 5 layer capability. The co-extruder line used was configured as described above with a co-extrusion feed block for the purpose of combining the flows into contacting layers. The flows were routed within the feed block so as to combine the layers prior to exiting the feed block and going into a coat hanger type extrusion die. The combined layers exiting the die flow as a molten curtain vertically onto a metal roller just prior to a second highly polished counter-rotating roll forming a nip with the first roll. The sheet contacts the highly polished surface for approximately ½ of its circumference prior to releasing the solidifying plastic to a third roll in the takeoff roller system. The sheet is subsequently taken through another nip system between rollers, which pulls the sheet in the system. The sheet is subsequently rolled onto a core creating a roll of sheet or cut to length and stacked.

Example 1

A 2-layer structure of Surlyn®9910/Bexloy® W720, using a clear Surlyn® top layer and a pigmented Bexloy® W720 backing layer was made employing a co-extrusion line. Surlyn®9910 is a 15 wt % acid (EMAA copolymer) which is approximately 50% neutralized. Bexloy®W720 is a polyethylene ionomer blend in which the polyethylene is a HDPE and the ionomer is an EMAA copolymer with 10 wt % acid that is neutralized to approximately 70%. The blend is intensively mixed.

Table 1 shows the ingredients feeding the 3 extruders being used in this case. These ingredients can be individually fed to each extruder or a pre-mixed blend of these components can be fed.

TABLE 1

| Sheet Layer | Extruder A Layer 1 (top) | Extruder B Layer 3 | Extruder C Layer 2 |
| --- | --- | --- | --- |
| Extruder Diameter (inches) | 2.5 | 2 | 1.5 |
| Materials: | | | |
| Surlyn ® 9910 | 99% | | |
| Bexloy ® W720 | | 95% | 95% |
| UV Processing Additives | 1% | | |
| Pigment Concentrate | | 5% | 5% |

TABLE 2

(equipment processing conditions)

| Temp Setpoint Profiles: (° F.) | Extruder A | Extruder B | Extruder C |
| --- | --- | --- | --- |
| Rear Feed Extruder Zone 1 | 305 | 400 | 400 |
| Mid Rear Zone 2 | 325 | 425 | 425 |
| Mid Front Zone 3 | 350 | 450 | 450 |
| Front Zone 4 | 360 | 475 | 475 |
| Front Zone 5 | 375 | 505 | 505 |
| Front Zone 6 | 380 | None | None |
| Transfer Pipes | 380 | 505 | 505 |
| Feedblock | | 505 | |
| Extruder screw rpm's: | 15 | 65 | 60 |
| Die (left/center/right) | 500/505/500 | | |
| Feed block plug ID | BBCAA | | |
| Take off roll temperatures | 70° F. | | |

The 2 material flows originating in the extruders forms a 2 layer sheet. Since 2 extruders are being fed the same materials, the layer thickness in this case are 6 mil for extruder A and 27 mil for the combined flows from extruders B & C.

This sheet can be thermoformed on a male tool with the Bexloy® W720 surface contacting the forming tool. In forming, the Surlyn® surface might change due to internal stresses in the sheet resulting in orange peel or a mottle appearance in the formerly glossy surface. This formed sheet can then be inserted into an injection tool for injection cladding. Bexloy® W720 would be a suitable backfilling material which can be injected onto the Bexloy® W720 side of the formed skin. In injection cladding, the Surlyn® surface exposed to a polished tool will soften and form to the tool surface enhancing the glossy appearance in the cladded part.

Example 2

A 3 layer structure of Surlyn®9910 (clear)/Surlyn®9910 (pigmented)/Bexloy® W720, using a clear Surlyn® top layer, a pigmented Surlyn® under layer and a Bexloy® W720 backing layer is made as in example 1.

Table 3 shows the ingredients feeding the 3 extruders being used in this case. These ingredients can be individually fed to each extruder or a pre-mixed blend of these components can be fed.

TABLE 3

| Sheet Layer | Extruder A Layer 1 (top) | Extruder B Layer 3 | Extruder C Layer 2 |
|---|---|---|---|
| Extruder Diameter (inches) | 2.5 | 2 | 1.5 |
| Materials: | | | |
| Surlyn ® 9910 | 99% | | 90% |
| Bexloy ® W720 | | 100% | |
| UV Processing Additives | 1% | | |
| Pigment Concentrate | | | 10% |

TABLE 4

(equipment processing conditions)

| Temp Setpoint Profiles: (° F.) | Extruder A | Extruder B | Extruder C |
|---|---|---|---|
| Rear Feed Extruder Zone 1 | 375 | 350 | 375 |
| Mid Rear Zone 2 | 400 | 375 | 400 |
| Mid Front Zone 3 | 400 | 400 | 400 |
| Front Zone 4 | 400 | 500 | 400 |
| Front Zone 5 | 400 | 510 | 400 |
| Front Zone 6 | 400 | None | None |
| Transfer Pipes | 400 | 510 | 400 |
| Feedblock | | 480 | |
| Extruder screw rpm's: | 15 | 190 | 150 |
| Die ( left/center/right) | 410/510/510 | | |
| Feed block plug ID | BBCAA | | |
| Take off roll temperatures | 75° F. large, 70° F. small | | |

The 3 material flows originating in the extruders form a 3 layer sheet. The layer thicknesses in this case are 2.5 mil for extruder A (top layer), 8 mil for extruder C (middle) and 19 mils for extruders B (backing).

This sheet can be thermoformed on a male tool with the Bexloy® W720 surface contacting the forming tool similar to example 1 forming. Again in forming, the Surlyn® surface might change due to internal stresses in the sheet resulting in orange peel or a mottle appearance in the formerly glossy surface. This formed sheet can then be inserted into an injection tool for injection cladding. Bexloy® W720 would be a suitable backfilling material which can be injected onto the Bexloy® W720 side of the formed skin. In injection cladding, the Surlyn® surface exposed to a polished tool will soften and form to the tool surface enhancing the glossy appearance in the cladded part.

This example exhibits a clear Surlyn®/colored Surlyn® system which provides the advantages of color matching in Surlyn® irrespective of the tie layer or backing material layer thickness or material. In addition, less pigment is required to provide a typical color match since Surlyn® has high clarity which is advantageous since less pigment is needed to hide the opacity of less clear materials.

Example 3

A 4 layer structure of Surlyn®9910 (clear)/Surlyn®9910 (pigmented)/co-extruded tie layer/Bexloy® W720, using a clear Surlyn® top layer, a pigmented Surlyn® under layer, a tie layer to improve adhesion between layers and a Bexloy® W720 backing layer was made with the equipment and general approach of the preceding examples.

Table 5 shows the ingredients feeding the 3 extruders being used in this case. These ingredients can be individually fed to each extruder or a pre-mixed blend of these components can be fed.

TABLE 5

| Sheet Layer | Ext. A Layer 1 (top) | Ext. B Layer 4 | Ext. C Layer 2 | Ext. D Layer 3 |
|---|---|---|---|---|
| Extruder Diameter (inches) | 2.5 | 2 | 1.5 | |
| Materials: | | | | |
| Surlyn ® 9910 | 99% | | 90% | |
| Bexloy ® W720 | | 100% | | |
| 75% LLDPE/25% EPDM elastomer | | | | 100% |
| UV Processing Additives | 1% | | | |
| Pigment Concentrate | | | 10% | |

TABLE 6

(equipment processing conditions)

| Temp Setpoint Profiles: (° F.) | Ext. A | Ext. B | Ext. C | Ext. D |
|---|---|---|---|---|
| Rear Feed Extruder Zone 1 | 375 | 350 | 375 | 375 |
| Mid Rear Zone 2 | 400 | 375 | 400 | 400 |
| Mid Front Zone 3 | 400 | 400 | 400 | 400 |
| Front Zone 4 | 400 | 500 | 400 | 400 |
| Front Zone 5 | 400 | 510 | 400 | 400 |
| Front Zone 6 | 400 | none | none | None |
| Transfer Pipes | 400 | 510 | 400 | 400 |
| Feedblock | | 480 | | |
| Extruder screw rpm's: | | | | |
| Die (left/center/right) | 410/510 /510 | | | |
| Take off roll temperatures | 75° F. large, 70° F. small | | | |

The 4 material flows originating in the extruders form a 4 layer sheet. The layer thicknesses in this case are 2.5 mil for extruder A (top layer), 8 mil for extruder C (middle) and 2 mils for extruder D and 17.5 mils for extruder B (backing).

This sheet can be thermoformed on a male tool with the Bexloy® W720 surface contacting the forming tool similar to example 1 forming. Again in forming, the Surlyn® surface might change due to internal stresses in the sheet resulting in orange peel or a mottle appearance in the formerly glossy surface. This formed sheet can then be inserted into an injection tool for injection cladding. Bexloy® W720 would be a suitable backfilling material which can be injected onto the Bexloy® W720 side of the formed skin. In injection cladding, the Surlyn® surface exposed to a polished tool will soften and form to the tool surface enhancing the glossy appearance in the cladded part.

This example again exhibits a clear ionomer/colored ionomer system with its advantages mentioned previously.

Example 4

In manner similar to that described above, the following multilayered structures can be made:

For HDPE backing Ionomer/Ionomer (pigmented)/tie/HDPE

For TPO backing Ionomer/Ionomer (pigmented)/tie/TPO

For PE backing Ionomer/Ionomer (pigmented)/tie/PE

For nylon backing Ionomer/Ionomer (pigmented)/tie/nylon

For PET backing Ionomer/Ionomer (pigmented)/tie/PET

For ABS backing Ionomer/Ionomer (pigmented)/tie/ABS

In a similar fashion, the pigmented Ionomer layer can be eliminated if the tie and/or backing layers are pigmented.

Note: backing substrates may be added by filling, foaming, compression molding or by other processes.

Example 5

In a manner similar to that described above, ionomer-polyamide structures can be made. The simplest of these structures will be of the form: ionomer-polyamide (pigmented)/tie layer/backing layer.

Examples with ionomer-polyamide surface layers with the following structures are:

For HDPE backing ionomer-polyamide (pigmented)//tie/HDPE

For TPO backing ionomer-polyamide (pigmented)//tie/TPO

For PE backing ionomer-polyamide (pigmented)//tie/PE

For nylon backing ionomer-polyamide (pigmented)//tie/nylon

For PET backing ionomer-polyamide (pigmented)//tie/PET

For ABS backing ionomer-polyamide (pigmented)//tie/ABS

Note: backing substrates may be filled, foamed, compression molded or applied by other processes.

For making a thermoplastic multilayer ionomer-polyamide/tie/TPO sheet, the following processing conditions can be used. Surlyn® Reflections SG201U white M261060 is an ionomer-polyamide blend with white color compounded into the resin, EP94592-116 adhesive layer is blend of polypropylene copolymer resin, anhydride modified polypropylene and elastomer resin. Solvay TPO E1501 is a rubber modified polypropylene copolymer.

TABLE 7

| Sheet Layer | Extruder A Layer 1 (top) | Extruder B Layer 3 | Extruder C Layer 2 |
|---|---|---|---|
| Extruder Diameter (inches) | 2.5 | 2 | 1.5 |
| Materials: | | | |
| Surlyn ® Reflections SG201U white M261060 | 100% | | |
| EP94592-116 adhesive layer | | | 100% |
| Solvay TPO E1501 | | 100% | |
| Layer Thickness (mils) | 9 | 3 | 8 |

TABLE 8

(equipment processing conditions)

| Temp Setpoint Profiles: (° F.) | Extruder A | Extruder B | Extruder C |
|---|---|---|---|
| Rear Feed Extruder Zone 1 | 410 | 400 | 350 |
| Mid Rear Zone 2 | 450 | 450 | 350 |
| Mid Front Zone 3 | 480 | 475 | 400 |
| Front Zone 4 | 480 | 500 | 410 |
| Front Zone 5 | 480 | 510 | 420 |
| Front Zone 6 | 480 | none | none |
| Transfer Pipes | 480 | 510 | 420 |
| Feedblock | | 510 | |
| Extruder screw rpm's: | 40 | 45 | 55 |
| Die (left/center/right) | 510/510/510 | | |
| Feed block plug ID | BBCAA | | |

Take off roll temperatures-Primary
Gloss roll:180° F.; Secondary rolls: 120° F.

Example 6

In systems employing ionomer as the top layer and systems employing ionomer-polyamide blends, recycle may be incorporated. For the purpose of this example, the Ionomer/Ionomer (pigmented) or Ionomer-Polyamide-Blend (pigmented) top layers are referred to as the "Top system." "Recycle+backing" represents that the recycle is included in the backing material. Typical structures which might be employed with recycle are as follows:

Top system/tie/recycle+backing

Top system/tie/recycle/tie

Top system/tie/recycle/tie/backing

Having thus described and exemplified the invention with a certain degree of particularity, it should be appreciated that the following claims are not to be so limited but are to be afforded a scope commensurate with the wording of each element of the claim and equivalents thereof.

We claim:

1. A multilayer film or sheet comprising a first layer, a second layer, a third layer; and optionally a tie layer, a recycled polymer layer, or both wherein the film or sheet is a thermoformable film or sheet;

the first layer is a surface layer and consists essentially of ionomer and a first additive;

the second layer comprises a first polymer and a second additive and is in contact with the first layer;

the first polymer is ionomer;

the third layer is in contact, directly or through the tie layer, with the second layer, and optionally comprises a third additive;

the third layer is ethylene copolymer, polyolefin, polyester, polyamide, or polyethylene-ionomer blend;

the ethylene copolymer is a copolymer of ethylene and (meth)acrylic acid, (meth)acrylate, alkyl(meth)acrylate, maleic anhydride, or vinyl acetate;

the first additive, the second additive, or the third additive is one or more UV stabilizer, UV absorber, antioxidant, thermal stabilizer, anti-stat additive, processing aid, fiber glass, mineral filler, anti-slip agent, plasticizer, nucleating agent, pigment, dye, flake, or mixtures thereof; and the tie layer is selected from a blend of polyethylene, ethylene/α-olefin copolymer, and ethylene elastomer; ethylene vinyl acetate; ethylene (meth)acrylate copolymer; ethylene butyl acrylate copolymer; polyethylene terephthalate and polyethylene terephthalate glycol copolymer resins; maleic anhydride modified polypropylene; copolymers containing anhydride grafts; or mixture thereof.

2. The film or sheet of claim 1 further comprising the tie layer and the ethylene copolymer is a polymer of ethylene and a comonomer selected from the group consisting of (meth)acrylic acid, (meth)acrylate, alkyl(meth)acrylate, maleic anhydride, and vinyl acetate.

3. The film or sheet of claim 1 wherein said first layer is clear and said second layer contains pigments, dyes, flakes, or mixtures thereof.

4. The film or sheet of claim 3 wherein the film or sheet has a thickness of from 8 to 60 mils and the ethylene copolymer is selected from the group consisting of ethylene (meth)acrylic acid copolymer, ethylene acrylic acid copolymer, ethylene (meth)acrylate copolymer, ethylene (meth)acrylic acid (meth)acrylate copolymer, ethylene (meth)acrylate maleic anhydride copolymer, ethylene vinyl acetate copolymer, ethylene methyl acrylate copolymer, ethylene acrylate copolymer, and ethylene butyl acrylate copolymer.

5. The film or sheet of claim 1 selected from the group consisting of
   ionomer/ionomer/ethylene copolymer;
   ionomer/ionomer/very low density polyethylene;
   ionomer/ionomer/ethylene acid copolymer;
   ionomer/ionomer/ethylene copolymer/polyethylene;
   ionomer/ionomer/ethylene copolymer/polyester copolymer;
   ionomer/ionomer/polyamide;
   ionomer/ionomer/tie layer/thermoplastic polyolefin;
   ionomer/ionomer/polyethylene-ionomer blend;
   ionomer/ionomer/tie layer/thermoplastic polyolefin;
   ionomer/ionomer/tie layer/polyester copolymer; and
   ionomer/ionomer/tie layer/recycle layer/tie layer/polyester copolymer.

6. An article consisting essentially of a substrate to which a multilayer film or sheet is adhered, wherein said multilayer film or sheet is as recited in claim 1.

7. The article of claim 6 wherein the multilayer film or sheet further comprises the tie layer.

8. The article of claim 6 wherein the first layer is clear and the second layer contains pigments, dyes, flakes, or mixtures thereof.

9. The article of claim 8 wherein the film or sheet has a thickness of from 8 to 60 mils.

10. The article of claim 6 wherein the multilayer film or sheet is selected from the group consisting of
    ionomer/ionomer/ethylene copolymer;
    ionomer/ionomer/very low density polyethylene;
    ionomer/ionomer/ethylene acid copolymer;
    ionomer/ionomer/ethylene copolymer/polyethylene;
    ionomer/ionomer/ethylene copolymer/polyester copolymer;
    ionomer/ionomer/polyamide;
    ionomer/ionomer/tie layer/thermoplastic polyolefin;
    ionomer/ionomer/polyethylene-ionomer blend;
    ionomer/ionomer/tie layer/thermoplastic polyolefin;
    ionomer/ionomer/tie layer/polyester copolymer; and
    ionomer/ionomer/tie layer/recycle layer/tie layer/polyester copolymer.

* * * * *